United States Patent

[11] 3,607,533

| [72] | Inventor | Alfred A. Moore |
| | | San Gabriel, Calif. |
| [21] | Appl. No. | 851,236 |
| [22] | Filed | Aug. 19, 1969 |
| [45] | Patented | Sept. 21, 1971 |
| [73] | Assignee | Paste-Well Corporation |
| | | El Monte, Calif. |

[54] PORTABLE LAMINATING MACHINE AND METHOD
38 Claims, 9 Drawing Figs.

[52] U.S. Cl. .................................................. 156/259,
118/418, 118/413, 156/555, 156/250
[51] Int. Cl. .......................................................... B32b 31/10,
B05c 3/18
[50] Field of Search .......................................... 156/270,
263, 356, 259, 271, 267, 346, 251, 152, 259, 555;
141/111, 110, 112; 118/413, 418

[56] References Cited
UNITED STATES PATENTS

| 2,534,320 | 12/1950 | Taylor | 118/418 |
| 2,660,218 | 11/1953 | Johnson et al. | 156/251 |
| 2,717,575 | 9/1955 | Merrifield | 118/413 |
| 2,973,801 | 3/1961 | Ballard | 156/152 |
| 3,356,556 | 12/1967 | Violette et al. | 156/259 |
| 3,399,096 | 8/1968 | Ranger | 156/259 |
| 3,438,835 | 4/1969 | Chen et al. | 156/555 |

FOREIGN PATENTS

| 688,763 | 6/1964 | Canada | 156/346 |

*Primary Examiner*—Benjamin A. Borchelt
*Assistant Examiner*—Daniel Bent
*Attorney*—Sellers and Brace ABSTRACT: A compact, portable machine and method for laminating sheet stock to substrate and equally suitable for onsite or central plant lamination of a decorative cover sheet to wallboard and the like building components with minimum handling and labor. The adhesive applicator has no moving parts and applies uniform coating to the web as the web is advanced beneath a supply of adhesive thereby applying a drag on the supply to create a roll of adhesive rolling counter to the direction of the web travel thereby applying the outermost layer of adhesive to the web. A single pair of laminating rollers press the laminae together while advancing the same. Rotating brushes depress the marginal edges of the web about the edges of the substrate without need for adjustment to compensate for tolerance variations in substrate width or synchronizing the brush speed with that of the laminate.

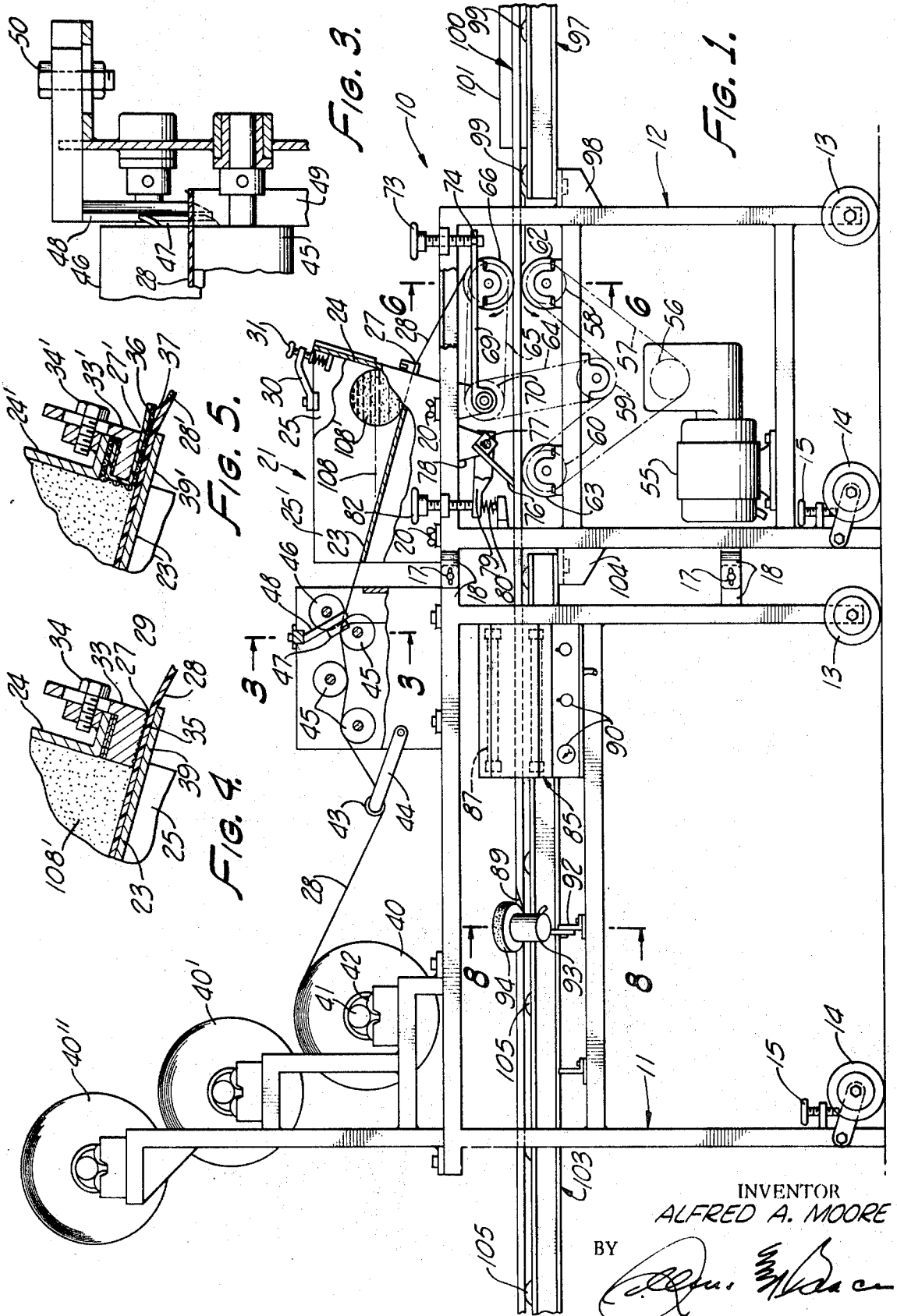

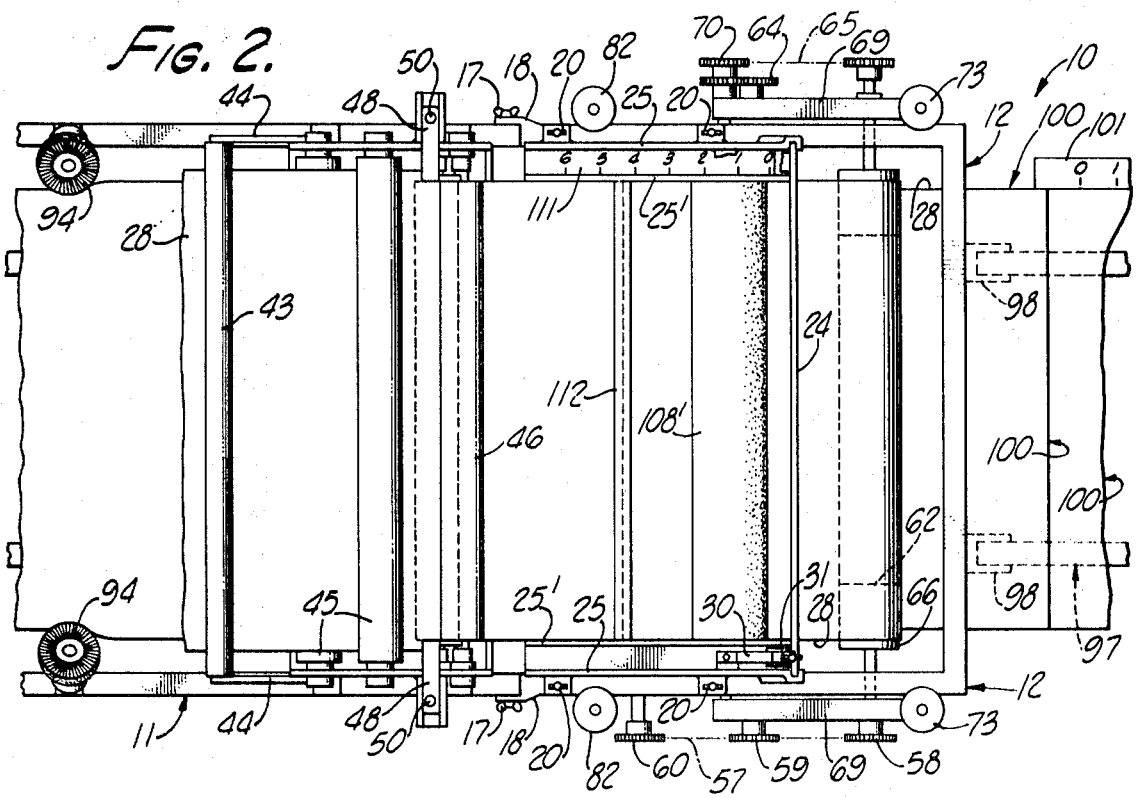

PORTABLE LAMINATING MACHINE AND METHOD

This invention relates to the laminating art, and more particularly to an improved compact, simplified laminating machine and method for laminating a flexible web to rigid substrate and having many varied applications including the lamination of a decorative final finish laminae to wallboard and the like construction components.

Laminators as heretofore proposed are notable for their complexity, reliance on precise synchronization of the numerous subassemblies and components, and the sensitivity of the equipment to changing conditions and tolerance variations in both the equipment and the material being handled. Additionally, prior equipment required repeated or continuous application of pressure to maintain the laminae assembled while the adhesive sets, the application of heat and ventilating air, and is beset by numerous vexatious problems including the nonuniform and unpredictable stretching of the cover web, the wrinkling thereof and the presence of trapped air bubbles. In efforts to overcome these and the like problems it has been commonplace for designers to include additional components and subassemblies intended to counteract individual problems, thereby unavoidably rendering the equipment even more sensitive and operable within a narrower range of conditions. Laminating problems are particularly severe if an attempt is made to conform the flexible sheet to a nonplanar surface as, for example, folding the marginal edges of the web about the lateral sides of substrate.

Efforts to minimize the stretching, wrinkling, puckering and the like problems, particularly pronounced when using thin plastic films alone or backed with fibrous material, by the expedient of using a faster-setting adhesive have introduced other troublesome problems. For example, such an adhesive must be applied to one or both laminae in close proximity to their point of pressure assembly. This introduces adhesive applicator problems not readily resolved with type of applicators heretofore proposed and commonly utilizing a group of transfer rollers in rolling contact with one another. Much effort and time must be expended in cleaning and servicing such equipment and care exercised in synchronizing its speed of operation with that of the laminating components. Owing to the above-mentioned and other shortcomings of prior laminator machines, it has not been feasible to laminate materials except in a central plant using heavy equipment operated by skilled personnel.

Currently, one of the very high volume needs for laminated material is wallboard and other building components covered with a final decorative layer, the finished product then being hung on studding without need for painting or any other finishing operation. Heretofore, the laminating of these panels, molding and the like, could be performed only at a central processing plant requiring the finished components to be transported to a distant construction site. This inherently subjects the finished product to repeated rehandling, exposure to the elements, and inevitably results in soiling and irreparable damage to the components.

With the foregoing disadvantages, shortcomings and limitations of the prior art in mind, it is the purpose of the present invention to provide a greatly simplified laminating machine and method so compact, foolproof and easily operated and controlled as to be suitable for transportation to a construction site and there utilized to produce the finished product close to the point of actual installation. To this end, the basic laminator is mounted on rollers and is so small and light as to be readily moved by one man from area to area. Simple lightweight roller conveyors may be attached to its opposite ends to facilitate feeding substrate into the laminator and for removing the laminated product therefrom. Featured is the complete absence of synchronized subunits with the possible exception of a third drive roller which may be used under certain conditions to aid in advancing the product through the machine. For this reason there are eliminated a host of problems associated with the numerous components heretofore required to be driven in predetermined synchronization. A unique adhesive applicator having no moving parts greatly simplifies the application of adhesive to one laminae and makes it feasible to use a fast-setting adhesive. The adhesive supply is supported on the upwardly facing back side of the web immediately upstream from a slot through which web passes. The draft produced on this body of adhesive by the advancing web converts the pool of adhesive into a rotating cylinder shedding all but the exterior surface of the cylinder from the ambient air and assuring that the exposed outer layer of adhesive is the first to contact and adhere to the web.

Another important feature of the simplified machine is the provision of rapidly rotating flexible bristle brushes in light pressure contact with the marginal edges of the web and effective to conform these edges faithfully with the underlying substrate contour. These brushes act to bring the marginal edges progressively into contact with the substrate thereby avoiding any possibility of trapping air and without tending to stretch or wrinkle the web. The brushes are insensitive to relatively wide-range changes in the dimensions of the substrate and apply substantially uniform pressure at all times. If the laminae consists of sheet plastic or other material softened by heating, the equipment preferably includes heater means positioned to heat the material as it approaches the rotating brushes.

It is therefore a primary object of the present invention to provide an improved machine and method for laminating flexible sheet stock to substrate using greatly simplified technique and equipment having an minimum of moving components.

Another object of the invention is the provision of a simplified, highly reliable adhesive applicator for sheet laminate having no moving parts.

Another object of the invention is the provision of an adhesive applicator for use in a laminating machine wherein a web being laminated supports a supply of adhesive and underrides and rotates a liquid cylinder of adhesive before passing through a coating thickness control slot.

Another object of the invention is the provision of a laminating machine for flexible sheet material wherein an adhesive layer is applied to the upwardly facing side of the material while passing beneath a restrained body of the adhesive resting thereagainst.

Another object of the invention is the provision of a machine for laminating a decorative finishing web to one face and the edges of the wallboard while advancing the adhesive coated components past a single set of laminating rolls and using a rapidly rotating brush to depress the marginal edges of the web against the edges of the wallboard.

Another object of the invention is the provision of a machine and method for continuously laminating a finish decorative cover to wallboard panels passing in end-to-end relation through a pair of laminating rolls and using rapidly rotating brushes pressed against the edge of the laminate.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view of the invention laminator with portions broken away to show structural details;

FIG. 2 is a top plan view of FIG. 1;

FIG. 3 is a fragmentary sectional view on a enlarged scale, taken along line 3—3 showing details of the trimmer subassembly;

FIGS. 4 and 5 are fragmentary cross-sectional views on an enlarged scale of two preferred slot constructions for providing an evenly distributed layer of adhesive on a web passing therethrough;

FIG. 6 is a fragmentary sectional view through the main laminating rolls taken along line 6—6 on FIG. 1;

FIG. 7 is a fragmentary cross-sectional view on an enlarged scale showing one of the heaters for the lateral edge of the flexible web;

FIG. 8 is a cross-sectional view on an enlarged scale taken generally along line 8—8 on FIG. 1; and FIG. 9 is a view similar to FIG. 8 but showing a second motor-driven brush appropriately supported for pressing the marginal edge of the flexible web against the rear face of the substrate.

Referring to FIGS. 1 and 2, there is shown a preferred embodiment of the invention laminating machine, designated generally 10. As there shown, machine 10 includes two wheel-supported rigid frames 11, 12 each supported on a pair of castering wheels 13 and a pair of vertically adjustable wheels 14 normally in retracted position but extendable by the operation of thumbscrews 15 to raise the associated legs of frame 12 off the floor. Each of frames 11 and 12 is of a size and weight easily moved by a single workman and is readily accommodated in either a construction or a building elevator for movement between the floors of a building under construction. Main frames 11 and 12 are normally rigidly connected together across their adjacent ends by thumbnuts 17 passing through openings in aligned brackets 18,18 projecting toward one another in overlapping relation from the respective main frames.

Detachably secured across the top of main frame 12, as by thumbscrews 20, is a generally trough-shaped adhesive applicator designated generally 21 characterized by the complete absence of moving parts. Applicator 21 has a downwardly and forwardly sloping flat bottom 23 and a readily removable vertically adjustable cooperating wall 24 lying generally at right angles to the plane of bottom 23. Wall 24 is slidably supported in channel ways formed in the forward edge of end walls 25. End walls 25 are parallel to one another and spaced apart at least the trimmed width of the web to be coated with adhesive. Desirably end walls 25 are spaced apart a greater distance to accommodate readily removable false end walls 25' (FIG. 2) shaped to seat snugly against walls 23,24. The false end walls are spaced apart by a distance corresponding to the particular width of the web being coated and are securable to the main end walls 25 by suitable clamping screws, or in any other suitable manner.

The forward transverse wall 24 is vertically adjustable toward and away from the protruding forward portion of bottom wall 23 to provide a slot 27 of desired height through which the coated web 28 passes with a layer of adhesive 29 adhering to its upper surface. The details of this slot will be described more fully presently. The means for adjusting the position of wall 24 may comprise brackets 30 secured to end walls 25 and supporting a thumbnut 31 with its lower end bearing against the upper edge of wall 24.

Referring now to FIG. 4, it will be understood that the lower edge of wall 24 is provided with an inverted L-shaped adhesive spreader 33 having its slotted upright leg securable to the reversely bent lower edge portion of wall 24 by capscrews 34. The accurately finished lower edge of spreader 33 is provided with crisscrossing shallow serrations or knurling 35 distributed uniformly from end to end thereof and effective in distributing and working the adhesive into firm contact with the upper surface of web 28. In consequence, the resulting layer 29 of adhesive is of uniform depth and evenly distributed over the full width of the web issuing from the slot 27.

In an alternate slot construction shown in FIG. 5, similar reference characters distinguished by a prime have reference to similar components. In that construction, the lower shorter leg of L-shaped member 33' is substantially thinner and is embraced by a pair of strips 36,37 throughout the length thereof and wrapped about the exterior of the shorter leg of member 33'. Inner strip 36 is preferably of flexible resilient material whereas the outer strip 37 preferably comprises a soft, flexible mesh of either metal or nonmetallic material. Nylon plastic mesh provides excellent results, is long wearing and possesses desirable resiliency. One pair of edges of strips 36,37 is suitably secured to the upper side of the shorter leg of member 33', the remainder of the width of these two members being merely pulled taut and in light pressure contact with the rearwardly facing edge and the underside of member 33'. It will be understood that the components of applicator 21 are preferably made of stainless steel and that the forward edge 39 of bottom 23 may have a thickness providing a resilient backup for web 28 while passing through the slot.

Web 28 is supplied to the rear upper edge of bottom wall 23 of the applicator from a supply roll 40 carried on a shaft 41 having its opposite ends resting on the bracket-supported rollers 42. Other supply rolls of the continuous flexible web material 40',40'' are similarly supported on brackets forming part of main frame 11. Web 28 is maintained smooth and taut by an idler roller 43 supported on freely pivoting arms 44 and by idling rollers 45 positioned as shown. The downstream one of rollers 45 has a square cut end and a length corresponding to the width of webbing desired to be laminated to the substrate. An idling roller 46 overlies the foremost roller 45 and cooperates therewith in holding web 28 flat and smooth immediately prior to passing onto the upper surface of applicator bottom wall 23. A sharp-edged trimming blade 47, suitably supported on adjustable bracket 48, has its cutting edge bearing lightly against the end of roller 45 (FIG. 3) and trims away the excess lateral edge portion 49 of web 28 as it enters the applicator. Supporting bracket 48 for the cutting blade is held detachable in a desired proper adjusted position by a clamping fastener 50.

The exceedingly simple, trouble-free laminating means provided by this invention for applying the coated web 28 to substrate will now be described with particular reference to FIG. 1. A suitable variable speed motor 55 carried by frame 12 has a low speed output sprocket 56 connected by chain 57 to sprockets 58, 59, 60 each fixed to a respective shaft suitably mounted in bearings carried by frame 12. Sprocket 58 drives a lower main laminating roll 62 and a similar auxiliary drive roller 63 and normally cooperating with roller 62 to support the laminate in a horizontal plane. Sprocket 59 drives a chain 64 on the far side of laminator frame 12 and, thereby, a third chain 65 driving a sprocket fixed to an upper laminating roll 66. Upper roll 66 is similar to lower roll 62 but is longer than the width of web 28. The lower roller is preferably narrower than the width of the substrate to engage the latter inwardly of metal mounting strips 67 (FIG. 6) commonly adhesively bonded to the underside of wallboard. The opposite ends of upper laminator roll 66 are mounted in similar arms 69 having their rear ends pivoted on the shaft-supporting sprocket 70. This permits the forward ends of bracket arms 69 carrying roller 66 to be adjusted toward and away from roller 62 without changing the tension in the drive chains. The adjustable means for arms 69 comprises a pair of thumbscrews 73 having threaded engagement with frame 12 and their lower ends captively socketed at 74 in arm 69.

Overlying auxiliary drive roller 63 is a resilient squeegee blade 76 extending crosswise of the machine directly above roller 63 and secured to a shaft 77 mounted between brackets 78. Fixed to this shaft is an operating arm 79 normally spring biased clockwise by spring 80 to hold the squeegee blade out of contact with the upper surface of the laminate. A thumbscrew 82 bears against the upper side of arm 79 and is effective to press the squeegee against the upper surface of the laminate under certain adverse operating conditions. It will be understood that blade 76 may be made of rubber, flexible plastic, spring metal, or the like, and can be adjusted downwardly to activate the driving effectiveness of roller 63 to a degree dependent upon the pressure applied by the squeegee blade.

Passing now to auxiliaries mounted on main frame 11, it is pointed out that a U-shaped electric heater is supported along either side comprising a housing 86 open on the side facing toward the laminate. Supported therein are elongated electric heaters 87,87 effective to heat and soften the projecting lateral edge 89 of the web 28. The heat tends to relax and soften the projecting edge of the web and aids in securing this edge to the lateral edges of the substrate in a manner which will be explained presently. Heaters 85 are mounted on frame 11 and are provided with adjustable controls 90 for regulating the heating effect of each heating element to suit the needs of the particular type of web 28.

Downstream and to the left of heaters 85 there is mounted, on adjustable universal brackets 92, a small electric motor 93 driving a cylindrical brush roll 94 of soft resilient bristles, such as nylon. The details of this auxiliary are best shown in FIG. 8, it being pointed out that brush 94 rotates in a plane intersecting the edge of the material being laminated, and preferably so as to depress the lateral edge 89 of laminae 28 into smooth faithful contact with the edge of the substrate.

Normally, wallboard substrate has a bevel on its outer corner and brush 94 is found highly effective in conforming the laminae to this bevel and to any other particular surface contour existing in the area underlying the brush. If the brush rotates in an inclined plane intersecting the length of the edge of the paneling then it will be apparent that the bristles tend to spread and straddle high points and as necessary to accommodate themselves to varying contour of the edge and thereby avoid rubbing crosswise of raised points or ridges. It will be understood that when the brushes are used on certain contours the brushes may be rotated in a plane crosswise of the path of advance whereas in other cases it is preferable that they rotate in an inclined plane such as that best illustrated in FIG. 8.

It is desired to wrap the lateral edge 89 of the upper layer against the back face of the substrate, this is readily accomplished using a second pair of motor-driven brushes 93',94' mounted on frame 11 downstream from the first described brushes and supported in the general manner illustrated in FIG. 9.

It sill be understood that the motor-driven brushes 93,94 operate at a substantially higher speed than feed rollers 62,66 and are quite insensitive to variations in speed. Of particular importance, the long flexible bristles of the brushes are highly effective in applying substantially uniform pressure to the edges 89 of the laminate despite wide tolerance variations in the width of the substrate. Both of these features contrast strikingly with the characteristics of prior proposals for deflecting and pressing the outer layer into conforming contact with the substrate using belts, rollers, spring fingers and the like, to deflect and press the laminae to the substrate and in synchronizing the speed of the pressing means with the advance of the lamination through the machine. All of these problems are avoided herein because the flexible bristles automatically compensate for wide range tolerance variations without adversely affecting the smoothing and assembly operation and without need for adjusting or shifting the position of the brushes or synchronizing their speed with that of another component. Furthermore, the brush bristles deflect the edge of the laminae progressively into conforming assembled relation without trapping air bubbles for the reason that the extreme outer edge of the laminae is the last to be pressed against the substrate. It is therefore virtually impossible for air to become trapped.

The basic laminating machine mounted on carriage-supported frames 11,12 is preferably used in combination with simple, lightweight sections of roller conveyors extending in opposite directions from either end of machine 10. The details of these conveyors are relatively unimportant. A supply conveyor 97 is secured to frame 12 through a pair of brackets 98, and includes a multiplicity of idler rollers 99 suitably spaced to support one or more panels of wallboard or substrate 100 in end to end relation. Conveyor 97 preferably includes a low height fence 101 along its rear edge positioned to center panels 100 between the edges of laminae web 28. A similar roller conveyor 103 is secured to brackets 104 crosswise of the discharge end of main frame 12 and is similarly equipped with idler rollers 105 coplanar with those on supply conveyor 97. The two roller conveyors may be made in short sections provided with folding legs and connectable together when in use and facilitating movement of the conveyor between operating sites.

OPERATION

The operation of the invention laminating machine will now be described as used to laminate a decorative flexible plastic finish web 28 to standard sections of wallboard paneling or substrate 100. It will be apparent that the same or closely related techniques can be used to laminate flexible covering material to other types and sizes of substrate and for performing other laminating operations.

Supply rolls 40, 40', 40'' of the decorative material are mounted on shafts crosswise of machine frame 11 in the manner made clear in FIG. 1 with the first supply roll to be used in the lower position. The rear face of web 28 is uppermost and is threaded beneath roller 43, past rolls 45, beneath roller 46 and across the top of bottom wall 23 of the adhesive applicator 21. The advance edge is fed through applicator slot 27 and about the right-hand side of the upper laminating roll 66, as viewed in FIG. 1. A supply of creamy consistency fast-setting adhesive is then poured into the applicator trough on top of the web to some suitable level, such as that indicated by the dot and dash line 108. Thumbscrews 31 of the applicator are adjusted as necessary to obtain a layer of adhesive issuing from slot 27 of a suitable thickness for the particular materials being laminated together. If the web material has a relatively heavy fabric or fibrous backing, a somewhat greater adhesive thickness is appropriate than otherwise. A panel 100 of substrate is then placed on supply conveyor 97 with its far edge in firm contact with fence 101 as it is manually pressed forward between the laminating roller 62,66 with the inverted layer of adhesive on web 28 facing downwardly against the upper surface of the panel. Motor 55 operates slowly initially while proper adjustments are being made of screws 73 for the upper roller 66. Normally the proper pressure conditions prevail as the adhesive starts to back up on the left side of the laminating rollers. As the laminated material advances leftward through the machine the projecting edges 89 of web 28 become heated by heater 85 and almost immediately thereafter are deflected and pressed against the edges of the substrate by the rapidly rotating brushes 94. These gradually deflect the protruding edges 89 of the decorative layer and progressively press the same into conforming contact with the bevelled and adjacent edge portions of the substrate.

As the remote end of the first panel 100 approaches the rollers, a second panel is placed on conveyor 97 with its forward end abutting the rear end of the preceding panel and its far edge pressed against fence 101. A slight manual push applied to this panel suffices to engage it between the laminating rollers after which it is automatically advanced in synchronism with web 28. After the first two laminated panels have passed downstream from main frame 11 a sharp blade may be inserted between the abutting ends of the panels used as a guide for the blade while severing the panels from one another flush with their ends.

Of particular importance is the fact that the forward movement of web 28 beneath the supply of adhesive 108 in applicator 21 immediately converts this mass into a substantially perfect rotating cylinder of adhesive 108'. This adhesive cylinder is maintained in rotation about its own center closely adjacent the entrance to slot 27 by the drag effect applied tangentially to its bottom by the forward movement of web 28. The significance of this is that a very fast-setting adhesive can be employed since the outermost layer of cylinder 108' is constantly rotating into transfer contact to the upper surface of web 28 and all other portions of the cylinder are shielded thereby from contact with the ambient air until a moment before the next layer is ready for similar transfer.

The machine continues to operate in the manner described until the first supply roll 40 has been substantially exhausted. The next roll 40' is shifted to the feed position and its square cut end is threaded past rollers 43, 45, 46 until overlying the rear portion of trough bottom 23. A measuring scale 110 (FIG. 2) extending lengthwise of fence 101 is then used in combination with a similar measuring scale 111 extending along one end wall of laminator 21 to determine the location of a bonding strip securing the new web to the exhausted web. If the forward end of the next panel to enter the laminator is then opposite graduation 4.5 of scale 110, the operator knows that the forward edge of web 28 from the new supply roll 40' should be secured to the old web opposite graduation 4.5 of scale 111. Holding the new web in this position, the operator applies an adhesive strip 112 with its right-hand half adhering to the old web 28 and the left-hand half adhering to the end of the new web. This bonding operation having been completed, the operator slowly starts the machine to advance the end of the new web beneath the supply of adhesive and through the slot 27. Preferably a short spacer block, not shown but of the same thickness as paneling 100, is inserted between the adjacent ends of the last and next panels. The tape 112 bonding the old and new webs together will overlie this spacer block and this portion of the old and new webs is trimmed away after the panels have passed through the laminator.

When it becomes desirable for any reason to use a thicker layer of adhesive on web 28 the appropriate laminating pressure may tend to force the adhesive to backup to the right of laminating rollers 62,66. Moreover, under these conditions, the use of higher than normal smoothing and laminating pressure may be desirable. Both of these exigencies are provided for very simply in the present machine by operating thumbscrews 82 to lower squeegee 76 into pressure contact with the laminated material thereby activating drive roller 63. In other words, as the squeegee presses against the top of the laminated material, it enables roller 63 to have effective driving contact with the lower side of the substrate and in an amount varying with the pressure applied by squeegee 76. In this way additional laminating and feeding action is applied to the laminate material enabling the operator to operate hand screws 73 and relieve to a substantial degree the pressure between rollers 62 and 66. Usually this pressure is relieved just sufficiently to prevent backup and displacement of adhesive at the point of contact with panel 100.

It will be noted that roller 66 is so located relative to the applicator discharge slot 27 as to permit the adhesive to increase in tackiness so that at the point of contact with paneling 100 it adheres thereto readily, quickly and tenaciously. In consequence there is no opportunity for air to become trapped, nor can the laminae slip, stretch, wrinkle or pucker. A fine adjustment of the time delay between slot 27 and contact of the adhesive with the paneling is readily obtained by varying the operating speed of drive motor 55.

While the particular portable laminating machine and method herein shown and disclosed in detail is fully capable of attaining the objects and providing the advantages hereinbefore stated, it is to be understood that it is merely illustrative of the presently preferred embodiments of the invention.

I claim:

1. That method of coating a continuous web with adhesive which comprises: advancing the web along the bottom of a trough and through a slot contiguous with the lower edge of a barrier crosswise of the trough, providing a supply of adhesive supported crosswise of the upper surface of the web and restrained against forward movement by the barrier, and advancing the web toward the slot beneath said supply of adhesive at a rate effective to convert said supply of adhesive into a rolling cylinder of adhesive rotating in contact with the upper side of the web as the latter advances tangentially past the lower side of said rolling cylinder of adhesive thereby applying adhesive to the web from the outer surface of said rolling cylinder of adhesive.

2. That method defined in claim 1 characterized in the step of controlling the thickness of the applied adhesive coating by varying the height of said slot through which the web is advanced.

3. That method defined in claim 1 characterized in the step of trimming the web as it advances to a width corresponding to the interior width of said trough.

4. That method defined in claim 3 characterized in providing said trough with detachable end walls securable to said trough with their adjacent inner sides lying contiguous with the trimmed width of said web.

5. That method defined in claim 1 characterized in the step of passing the coated web discharging from said slot between a pair of cooperating drive roller means, and utilizing said roller means to press said web against substrate passing past said roller means in the same direction and at the same rate of travel as said web.

6. That method defined in claim 5 characterized in the step of utilizing a pair of roller means covered with thick resilient material mounted in spaced-apart parallel relation and cooperating to press the coated web against an elongated substrate to laminate the same together under pressure.

7. That method defined in claim 6 characterized in the step of feeding said substrate into laminating position between said roller means on a level underlying said coated web, and utilizing the upper one of said pair of rollers to invert the coated web so that the coated side thereof faces downwardly against the upper surface of the substrate.

8. That method defined in claim 6 characterized in the step of utilizing a strip web having a width wider than the width of the substrate, and depressing the opposite lateral edges of the coated web against the opposite lateral surfaces of said substrate by rotating bristle means applied against the uncoated surface of the web in a direction to press the coated web into conforming contact with the juxtaposed substrate surface.

9. That method defined in claim 8 characterized in the step of using rotating bristle means mounted on a power-driven shaft held in a plane extending generally crosswise of the path of advance of the laminate and at an angle to the surfaces of the laminate contacted by the rotating bristles.

10. That method defined in claim 8 characterized in the step of applying heat to at least one lateral edge of said coated web to relax the web in advance of contact of the rotating bristles therewith.

11. That method defined in claim 6 characterized in the step of passing the newly laminated portion of said substrate past a third driven roller while depressing the substrate thereagainst under pressure by applying pressure against the exposed surface of the web via a resilient strip in contact with the web crosswise thereof in an area opposite the axis of said third roller.

12. That method defined in claim 11 characterized in varying the share of the driving load applied to said laminate by said third roller by varying the pressure applied to the exposed surface of the web generally opposite the axis of said third roller.

13. That method defined in claim 11 characterized in the step of varying the share of the laminate feeding load between said pair of rollers and said third roller by varying the pressure applied to the laminate by said pair of rollers and by varying the pressure applied against the exposed surface of said web opposite said third roller.

14. That method of laminating a decorative web to the face and lateral edges of wallboard paneling which comprises passing a continuous inverted strip of thin flexible decorative web having a width substantially wider than the width of wallboard paneling to be laminated along a flat-bottomed trough beneath a supply of adhesive in contact with the full upper width of said web and through a slot effective to limit the thickness of the adhering coating of adhesive, pressing the coated web against the face of a wallboard panel lengthwise thereof while being advanced with and at the same rate as said web, and rotating brushes against the outer uncoated surface of the lateral edge portions of said web to depress the same against the lateral edges of said wallboard panel.

15. That method defined in claim 14 characterized in the step of trimming said web as it approaches the supply of adhesive in said trough so that the web width corresponds to the width of the trough and of the overlying supply of adhesive resting against the upper face of the web.

16. That method defined in claim 14 characterized in the step of holding said web flat and outstretched as the web advances across the bottom of said trough and beneath the supply of adhesive in said trough.

17. That method defined in claim 14 characterized in the steps of advancing wallboard paneling in end to end aligned abutment into contact with the advancing coated web with the opposite lateral edges thereof spaced inwardly from the edges of the coated web by a distance corresponding generally with the thickness of the paneling, and heating the lateral edges of the coated web in advance of said rotating brushes to facilitate the deflection and smooth surface-conforming adherence thereof to the lateral edges of the paneling.

18. That method defined in claim 14 characterized in the step of utilizing a single pair of counterrotating rollers held pressed transversely against the remote surfaces of said web and paneling to press the same together and to control the synchronized advance thereof.

19. That method defined in claim 18 characterized in the step of passing the uncoated side of said web over one of said pair of rollers for a distance sufficient to invert the coated web before the coating engages the upper surface of the paneling.

20. That method defined in claim 14 characterized in the step of rotating said brushes about an axis extending crosswise of the edge of said paneling with the plane of rotation of the brush bristles intersecting the panel edge at an obtuse angle to the laminated surface of the paneling.

21. That method defined in claim 14 characterized in the step of threading a fresh continuous length of web beneath the adhesive supply in said trough by placing the inverted advance end of the new web against the upper surface of the end portion of the old web in an area thereof on the upstream side of said adhesive supply, and securing a narrow strip of the leading end of the new web to the adjacent surface of the underlying old web while pulling the new web beneath the adhesive and through the slot controlling the coating thickness.

22. That method defined in claim 17 characterized in the step of utilizing the adjacent ends of newly laminated paneling as a guide for a cutting blade while severing said web lamination from edge to edge to separate the adjacent panels from one another.

23. A compact, portable machine or laminating a decorative layer to wallboard paneling at the installation site of the paneling, said machine having a main frame provided with a pair of oppositely driven laminating rolls mounted crosswise thereof, a broad V-shaped trough extending crosswise of said frame having a low height slot with its bottom side flush with one bottom wall of the trough, means for supporting a supply roll of decorative web material with the rear surface of the advance end thereof facing upwardly and extending through said slot with the decorative surface lying against one upper bottom surface of said trough, said trough having closed ends spaced apart the width of said web and adapted to contain a supply of adhesive resting against the upwardly facing surface of said web, said slot being effective to control the thickness of the adhesive coating, said pair of rollers being positioned in the path of advance of the coated web and adapted to pass therebetween with the coating layer facing toward a wallboard panel, and said driven rollers being effective to press said web into smooth contact with said panel while advancing both therepast.

24. A portable laminating machine as defined in claim 23 characterized in the provision of supplemental power drive means for feeding the laminated paneling forward comprising: a driven roller bearing against the paneling on the face remote from said decorative web, and adjustable nonrotating pressure applying means movably supported on the other side of said paneling and adapted to be moved into pressure contact with the decorative web downstream from said pair of rollers to aid in advancing the laminated paneling and to avoid applying sufficient pressure to said pair of rollers as to displace portions of the adhesive coating along the bight between said pair of rollers.

25. A machine as defined in claim 23 characterized in that said decorative web is sufficiently wide to project laterally beyond the edges of said paneling, and power-driven brushes mounted on said frame downstream from said pair of rollers with the shafts thereof extending crosswise of and inclined to either lateral edge of the paneling with the bristles positioned to press the projecting web edges into snug contact with the edges of the paneling, said bristles readily accommodating substantial variations in the width of the paneling without need for adjusting the position thereof.

26. A laminating machine as defined in claim 25 characterized in the provision of heater means positioned to heat the projecting lateral edges of said decorative web as the same approaches said rotating brushes.

27. A laminating machine as defined in claim 23 characterized in that said frame is provided with rollers movable into lowered position against a floor to support said machine thereon while being moved from one position to another at a construction site and onto and off a transporting vehicle while going to and from the construction site.

28. A laminating machine as defined in claim 26 characterized in the provision of roller-conveyor means detachably securable to the opposite ends of said main frame to facilitate the support and feeding of wallboard paneling between the entrance side of said pair of rollers and to receive and support laminated paneling discharging from the downstream end of said machine.

29. A laminating machine as defined in claim 23 characterized in the provision of variable speed drive means for said pair of rollers, one of said rollers being the principal means for advancing said web through said trough of adhesive and the other of said pair of rollers being the principal means for advancing paneling through said machine.

30. A laminating machine as defined in claim 23 characterized in that said trough means for applying a coating of adhesive to a continuous web is quickly removable as a unit.

31. A laminating machine for laminating a continuous flexible strip to rigid substrate, said machine having a rigid frame supporting a pair of power-driven laminating rolls cooperating to press said web and substrate together under pressure, adhesive applicator means mounted on said frame having a broad shallow trough extending crosswise of the path of the web and closed at its ends by end wall means spaced apart by the width of the web, said trough having a wide flat bottom on one side thereof leading into a shallow slot coextensive with the interior length of said trough and through which the web passes while advancing toward said laminating rolls, and said trough being adapted to be charged with a supply of adhesive resting on the upper surface of the web whereby the upwardly facing surface of the web is coated as the web is advanced through said slot and between said laminating rolls.

32. A laminating machine as defined in claim 31 characterized in that one bottom wall of said trough is adjustably supported for lowering and raising relative to the other bottom wall thereby to vary the height of said slot through which the coated web passes.

33. A laminating machine as defined in claim 32 characterized in that the lower edge of said bottom wall is serrated transversely thereof to provide for the feeding and distribution of adhesive as the web passes through the slot.

34. A laminating machine for laminating a flexible laminae to substrate having nonplanar portions, said machine comprising means for feeding and pressing together a length of said substrate and a flexible laminae with a layer of adhesive therebetween, and rotating brush means supporting along the path of travel of said web and substrate with the bristles thereof positioned to depress the advancing web into firm contact with the juxtaposed nonplanar surface of said substrate and in faithful conformance with the contour thereof.

35. That method of coating a surface of continuous strip material with a fast-setting layer of fluent material which method comprises: supporting a body of fluent fast-setting fluent material in a confined body in contact with the surface of said strip material, and advancing said strip material past said confined body of fluent material and past a coating thickness control barrier therefor at a rate effective to convert said body of fluent material into a rolling cylinder thereof in contact with the surface of said strip material as the latter advances tangentially therepast and past said thickness control barrier.

36. That method defined in claim 35 characterized in the step of applying the exposed side of the coating on the material issuing from the discharge side of said barrier against the surface of other material while advancing said other material in unison with said coated surface.

37. That method defined in claim 36 characterized in that said fast-setting fluent material includes fast-setting adhesive.

38. That method defined in claim 35 characterized in the steps of using a fluent coating material embodying fast-setting adhesive effective upon setting to bond together surfaces in contact with the opposite surfaces of a layer thereof, and pressing the exposed surface of the coating on said strip material after the same issues past said barrier against the surface of other material while advancing said other material in unison with said coated surface.